United States Patent [19]
Schröter et al.

[11] 3,803,802
[45] Apr. 16, 1974

[54] PROCESS FOR RETARDING FLOWING RADIOACTIVE NOBLE GASES

[75] Inventors: Hans-Jürgen Schröter, Essen-Frillendorf; Harald Jüntgen; Dieter Zündorf, both of Essen-Heisingen; Karl Knoblauch, Essen-Frillendorf, all of Germany

[73] Assignee: Bergwerksverband GmbH, Essen, Germany

[22] Filed: Dec. 9, 1971

[21] Appl. No.: 205,411

[30] Foreign Application Priority Data
Dec. 10, 1970 Germany............................ 2060676

[52] U.S. Cl. .......................................... 55/66, 55/74
[51] Int. Cl. ............................................. B01d 53/04
[58] Field of Search ............ 55/66, 74, 387; 252/445

[56] References Cited
FOREIGN PATENTS OR APPLICATIONS
243,738  3/1963  Australia................................ 55/66
916,212  1/1963  Great Britain......................... 55/66

OTHER PUBLICATIONS
Perry, Chemical Engineer's Handbook, 4th ed., 1963, p. 16-4.

*Primary Examiner*—Charles N. Hart
*Attorney, Agent, or Firm*—Michael S. Striker

[57] ABSTRACT

Process for retarding flowing radioactive noble gases which comprises conducting an exit gas or discharge gas containing such noble gases through a column filled with active carbon wherein in the case of krypton retardation, the active carbon has a bulk density of 500–650 g/l and in the case of xenon retardation, a bulk density of 450–580 g/l and wherein the flow velocity of the exit or discharge gas in the interstices of the active carbon bed lies between the maximum linear flow velocity as shown in the drawing forming a part of the instant disclosure and a minimum flow velocity of 6 cm/min.

4 Claims, 1 Drawing Figure

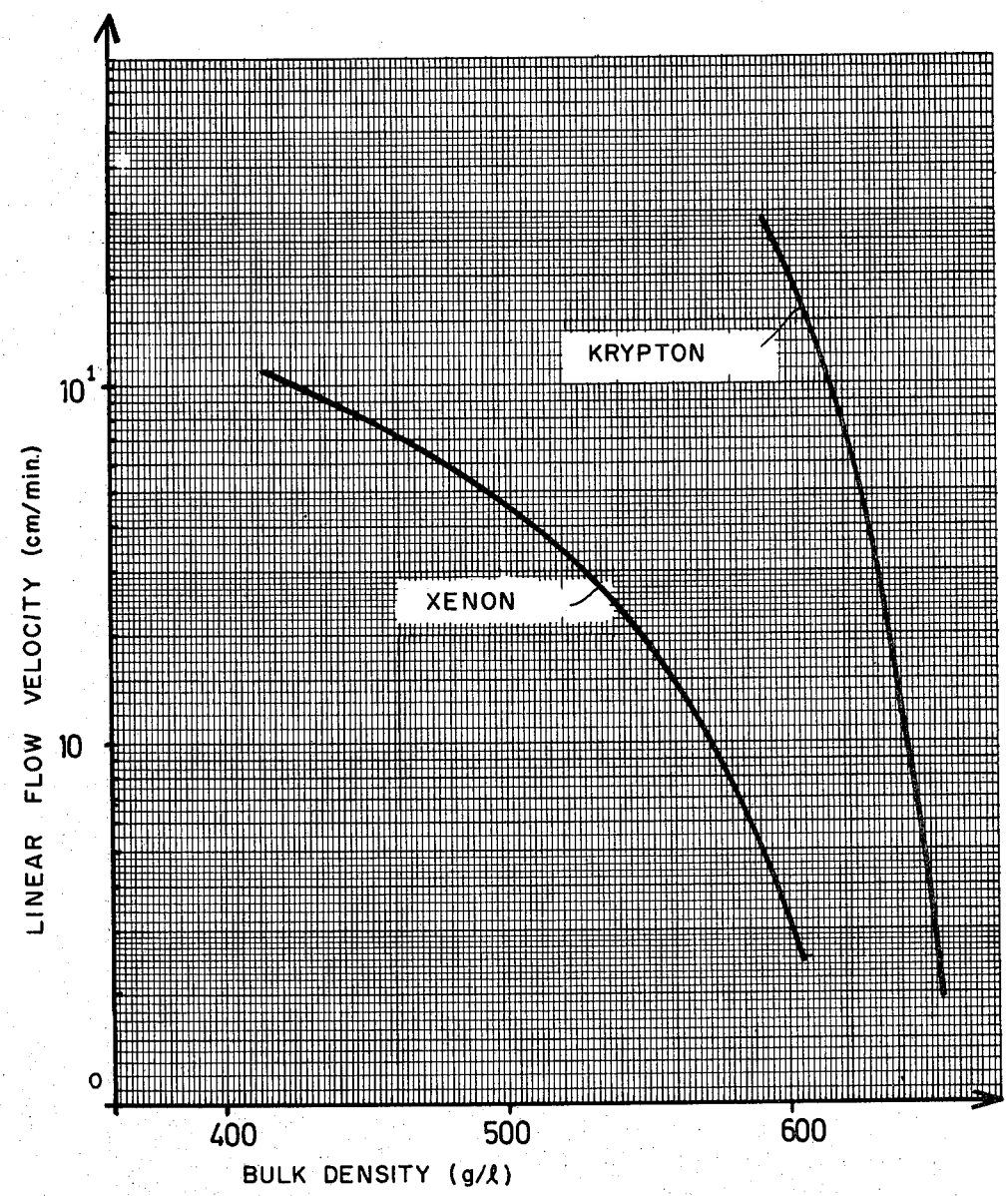

PROCESS FOR RETARDING FLOWING RADIOACTIVE NOBLE GASES

This invention relates to a process for retarding the discharge of radioactive noble gases into the atmosphere by utilizing for such retardation active carbon.

It is already known that the gas discharged from nuclear reactors and the working up installations associated with nuclear reactor burners contains a large amount of radioactive nuclides of the noble gases, krypton and xenon. It is possible to separate out the latter gases through low temperature distillation, absorption or adsorption. In general, it is sufficient if the escape of the radioactive noble gases into the atmosphere is retarded by a certain amount of time which will permit their radioactivity to be extensively decreased. Such a timewise retardation of the noble gas emission is realized by passing the exit or discharge gas through a long column filled with a porous adsorption agent. As filling materials for this purpose, there come into consideration in the main, active carbons which on the basis of their ability to adsorb krypton and xenon is compared to the empty column considerably slow down the passage of the gas whereby the dwell time of the noble gas in the column is considerably increased. The so-called retention factor R designates the amount by which this dwell time is increased in a column through the presence therein of a porous adsorption agent as compared to an empty column.

$t_R$ can be defined as follows:

$$t_R = (R \cdot V_B / v) \quad (1)$$

$t_R$ = retardation or retention time (hr)
$V_B$ = bed volume (m³)
$v$ = gas through flow (m³/hr)
$R$ = retention factor $t_R$ represents an average retardation time; a small amount of the rare gas nuclides are discharged from the column earlier then this average value and a further small part, at a later time.

$t_R$ and also R in general are determined by passing a gas stream into the bottom end of a column which has been filled with active carbon, first marking the gas with detectable isotopes for instance by introduction therein of radioactive krypton-85 or xenon-133 and thereafter detecting such isotopes at the upper end of the column by means of suitable detectors for instance a counter apparatus. By lowering the temperature of the adsorbent and by carrying out an extensive predrying thereof, the retention factor of the discharge gas can be considerably increased.

Heretofore, there has been employed in connection with the retardation of flowing rare gases, active carbon having the highest possible inner surface area and the lowest bulk density.

The instant invention is based on the recognition and finding that in contrast to the prevailing opinion that for the retardation of flowing rare gases a large inner surface area and a correspondingly low bulk density of the active carbon were required that these are not of essential significance. As a result of experimental work carried out by the applicants with active carbons of different qualities and properties, it has been established that by no means are active carbons having large inner surface areas of for instance 700 to 1,400 m²/g and correspondingly low bulk densities of for instance 300 g/l – 450 g/l suitable or desirable for carrying out the retardation of flowing noble or rare gases. The applicants' experimental work has repeatedly shown that higher retention factors for krypton and xenon can be obtained if in place of the heretofore employed active carbons, active carbons with higher bulk densities and lower inner surface areas are utilized.

In detail, it has now been found that the retention factor with increasing bulk density of the active carbon, above all is increased up to a maximum and at still higher bulk densities the value drops off (as can be seen from the following table). Maximal retention factors for krypton are obtained at bulk densities of the active carbon amounting to between 500 to 650 g/l and for xenon at bulk densities amounting to between 450 and 580 g/l.

Most surprisingly, it has now been found that by taking advantage of the high retention factor of the acitve carbon, the desired increased retardation is still realized only if the rare or noble gas containing exit or discharge gas is fed through the column filled with the active carbon at a velocity which lies between a predetermined maximum linear flow velocity (as shown in the drawing forming part of this disclosure) and a minimum flow velocity of 6 cm/min. If the maximum flow velocity is exceeded, a stepwise fall-off in the activity of the active carbon used in the process of the invention results. Flow velocities under 6 cm/min. are required in general in connection with the utilization of columns with unsuitably high cross sections.

The linear gas velocity is calculated on the space volume of the bed and is defined as follows:

$$u = (v / \epsilon \cdot q) \quad (2)$$

$u$ = linear gas velocity calculated on the space volume (m/hr)
$\epsilon$ = interstitial volume portion of the bed
$q$ = bed cross section (m²)
$v$ = gas through flow (m³/hr)

There can easily be obtained at any given time a suitable linear gas flow velocity by selecting a column of correspondingly suitable cross sections. The interstitial volume is separately determined and in general amounts to about 0.35.

In accordance with the invention, therefore, there has now been found that the krypton and xenon present in flowing radioactive exit or discharge gases can be retarded by feeding such discharge gas into and through a column filled with active carbon, wherein the active carbon in the case of krypton retardation has a bulk density of 500–650 g/l and in the case of xenon retardation, a bulk density of 450–580 g/l and wherein the flow velocity of the discharge gas in the interstices of the active carbon bed lies between a predetermined maximum flow velocity (as shown in the accompanying drawing) and the minimum flow velocity of 6 cm/min.

A special advantage of the invention lies in that the retardation of the rare gas can be achieved with comparatively small active carbon bed wherein this same effect is possible utilizing relatively smaller columns.

This has the advantage that the costly shielding or screening of radioactive gases flowing through the columns can be considerably decreased.

The following Table shows the retention factors of active carbons of different bulk weights. The inner surface areas in each case was determined using argon at 90°K. The retardation time $t_R$ was determined with dried active carbon at 23°C and the retention factor calculated on the basis of equation 1 set out above.

TABLE

| Active Carbon | Bulk Density (g/l) | Inner Surface (m²/g) | Retention Factor Krypton | Retention Factor Xenon |
|---|---|---|---|---|
| Mineral coal | 380 | 1380 | 14.9 | 205 |
|  | 490 | 973 | 22.5 | 378 |
|  | 570 | 600 | 26.3 | 440 |
|  | 635 | 298 | 28.1 | 435 |
|  | 680 | 30 | 17.5 | 100 |
| Wood coal | 300 | 649 | 17.5 | 188 |
|  | 503 | 416 | 25.0 | 371 |
| Coconut shell | 420 | 1228 | 16.4 | 248 |
|  | 510 | 869 | 20.9 | 341 |

The following Examples are given in order to more fully illustrate the invention and are in nowise to be construed as in any way limiting the scope thereof.

EXAMPLE 1

For xenon, a retardation time of 15 days (360 hours) is requred. By using an active carbon derived from mineral coal having a retention factor $R = 378$ (bulk density = 490 g/l) there was found for 80 m³/hr. discharge gas according to equation 1 a bed volume of
$$V_B = (t_R \cdot v/R) = (360 \cdot 80/378) = 76.5 \text{ m}^3$$
with an adsorbent cross section of 1 m². The column filled with active carbon had a length accordingly of 76.5 m. The linear gas velocity was calculated with reference to the interstitial volume of $\epsilon = 0.35$ according to equation 2.
$$u = (v/\epsilon \cdot q) = 80/0.35 \cdot 1 = 228.5 \text{ m/h} = 382 \text{ cm/min}.$$

When there was used in place of the active carbon on the basis of mineral coal, an active carbon prepared from wood coal having a retention factor $R=188$ (bulk density = 300 g/l there was observed a bed volume of $$V_B = (360.80/188) = 152 \text{ m}^3$$

also with a column cross section of 1 m² and a total height of 152 m.

EXAMPLE 2

A retardation time of 20 days (480 hours) is required for xenon. By using an active carbon derived from mineral coal having a retention factor $R = 440$ (bulk density = 570 g/l) there was observed for 50 m³/hr. discharge gas on the basis of equation 1 a bed volume of $$V_B = (t_R \cdot v/R) = (480 \cdot 50/440) = 54.6 \text{ m}^3$$

With an adsorbent cross section of 2.4 m², the column filled with active carbon accordingly had a length of 22.75 m. Calculated on an interstitial volume $= 0.35$ the linear gas velocity amounted according to equation 2 to the following:
$$u = (v/\epsilon \cdot q) = (50/0.35 \cdot 2.4) = 59.5 \text{ m/hr} = 99 \text{ cm/min}$$

This value falls below the maximum flow velocity shown in the attached drawing.

EXAMPLE 3

A retardation time of one day (24 hours) is required for krypton. By using an active carbon derived from mineral coal having a retention factor $R=28.1$ (bulk weight = 635 g/l), there was observed for 80 m³/hr. discharge gas according to equation 1 a bed volume of
$$V_B = (t_R \cdot v/R) = (24 \cdot 80/28.1) = 68.3 \text{ m}^3$$

At an adsorbent cross section of 2 m², the active carbon filled column amounted to 34.15 m in length.

The linear gas flow velocity calculated on an interstitial volume ($\epsilon = 0.35$) amounted according to equation 2 to
$$u = (v/\epsilon \cdot q) = (80/0.35 \cdot 2) = 114 \text{ m/hr} = 190 \text{ cm/min}.$$

When there was used in the same run active carbon derived from coconut shells having a retention factor $R=20.9$ (bulk density = 510 g/l), a bed volume of
$$V_B = (t_R \cdot v/R) = (24 \cdot 80/20.9) = 92 \text{ m}^3$$
was observed in a column having a cross section of 2 m² and a total height of 46 m.

We claim:

1. A process for retarding the flow of radioactive noble gases in a continuously flowing stream of a gas containing radioactive noble gases which comprises passing the said gas having a linear veolicty of at least 6 centimeters per minute through a column packed with activated carbon particles having a bulk density between 450 and 650 grams per liter and thereby retarding the flow of said noble gases for a time sufficient to decrease the radioactivity of said noble gases.

2. Process according to claim 1 wherein said active carbon is derived from mineral coal, wood coal or coconut shells.

3. A process as defined in claim 1, in which the radioactive noble gas consists essentially of krypton and the activated carbon particles have a bulk density between 500 and 650 grams per liter.

4. A process as defined in claim 1, in which the radioactive noble gas consists of xenon and the activated carbon particles have a bulk density between 450 and 580 grams per liter.

* * * * *